F. J. KEPPLER.
CONVERTIBLE BUILDING.
APPLICATION FILED JUNE 7, 1919.
1,437,148.
Patented Nov. 28, 1922.
8 SHEETS—SHEET 1.
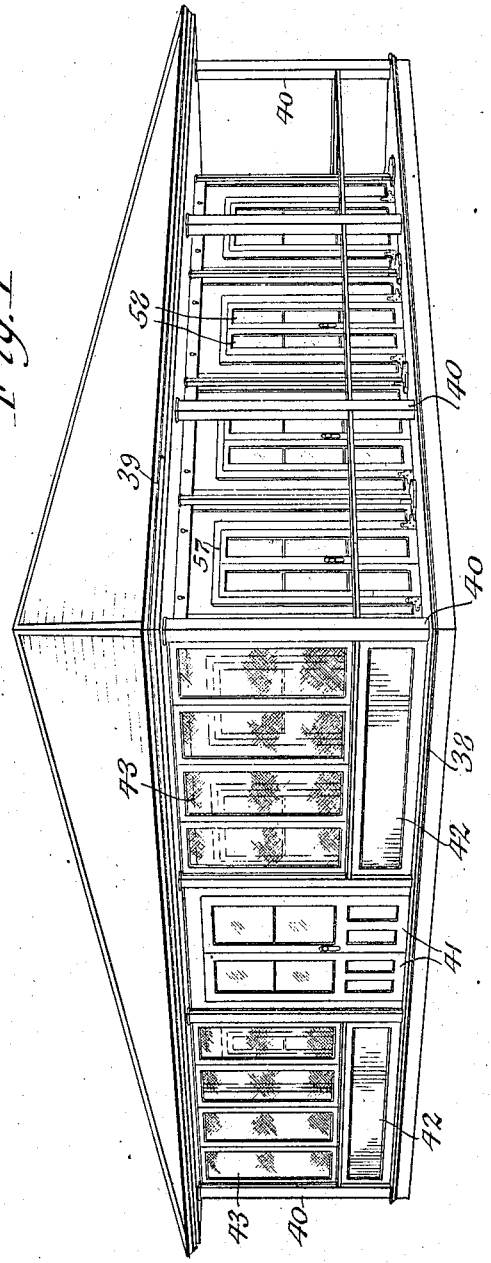
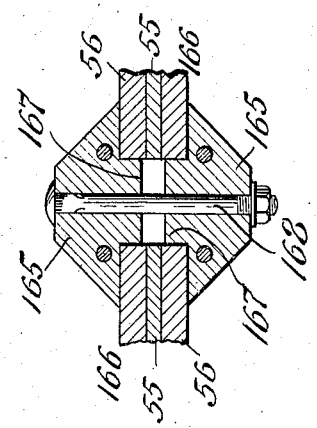
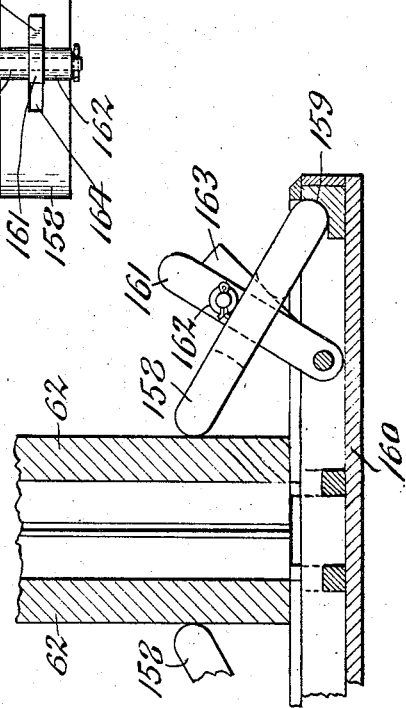
Inventor
Fred J. Keppler
by Geyer & Robb
Attorneys F. J. KEPPLER.
CONVERTIBLE BUILDING.
APPLICATION FILED JUNE 7, 1919.
1,437,148.
Patented Nov. 28, 1922.
8 SHEETS—SHEET 2.
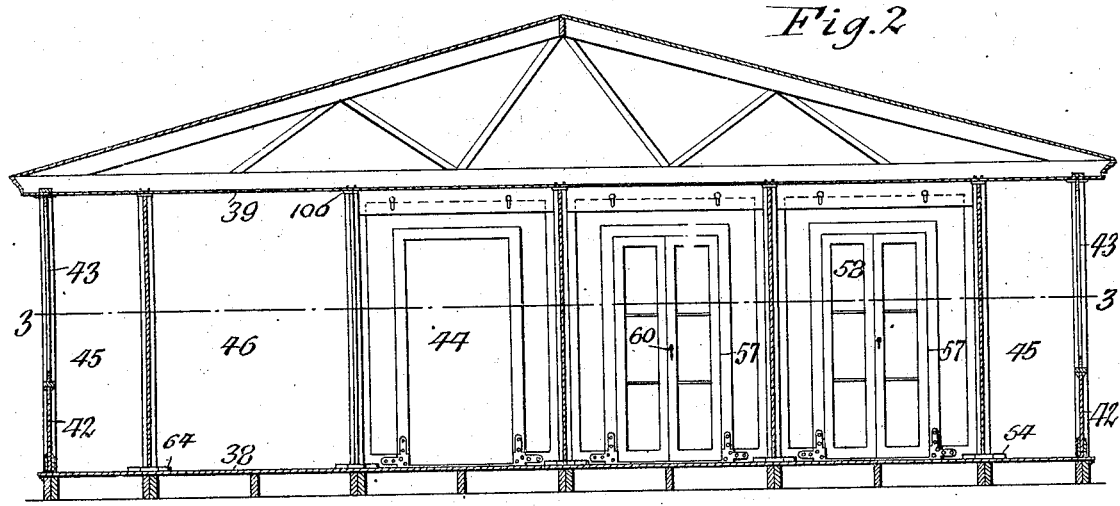
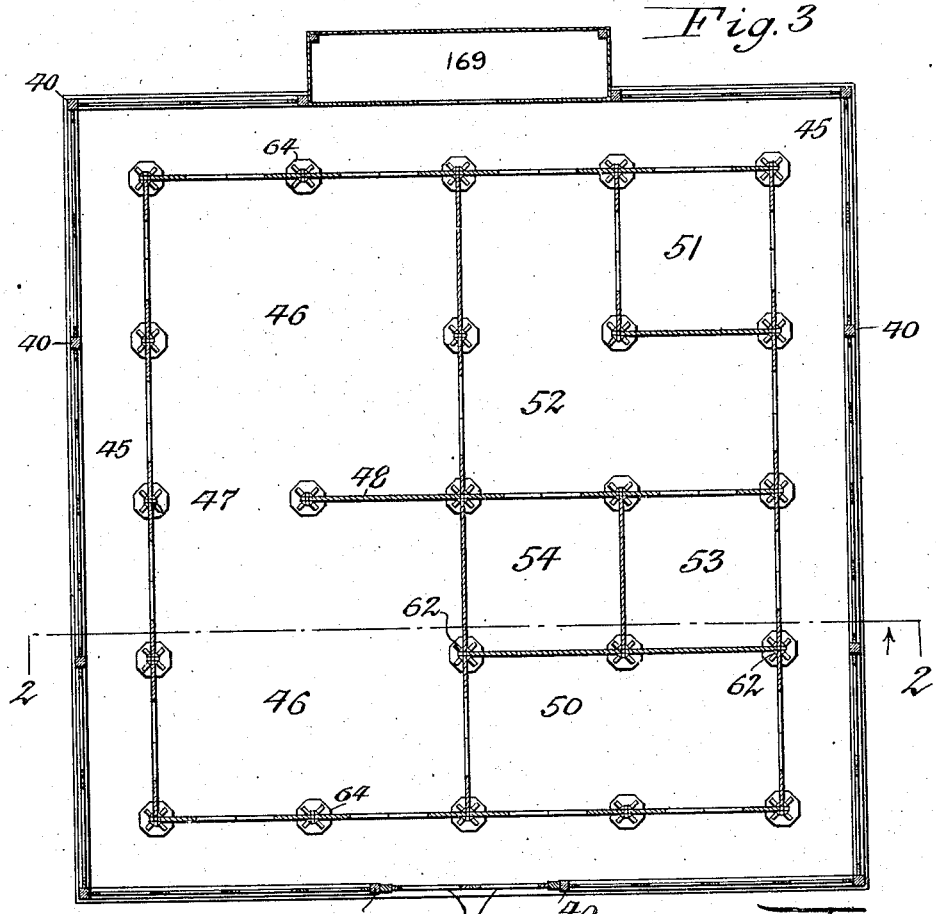

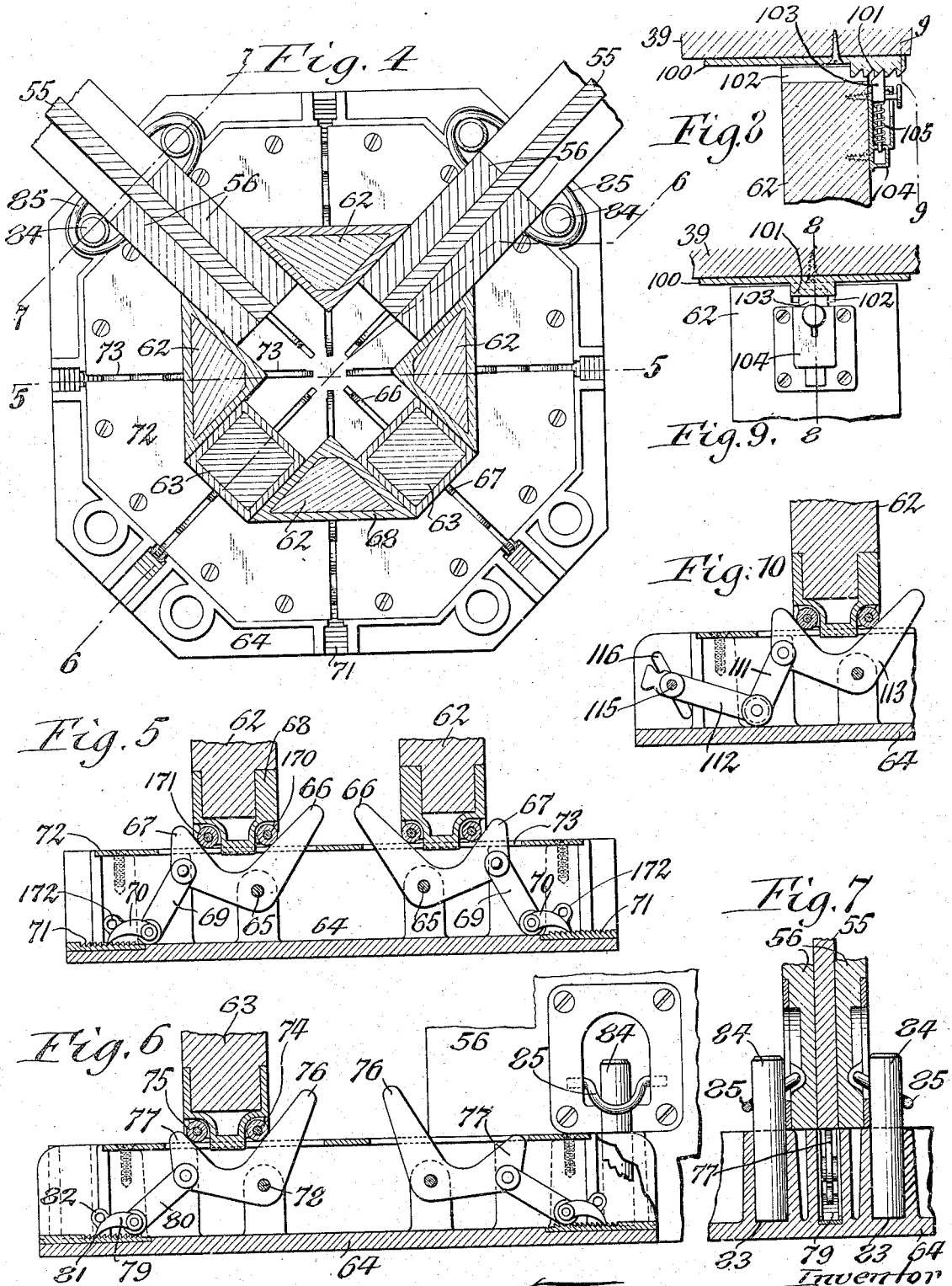

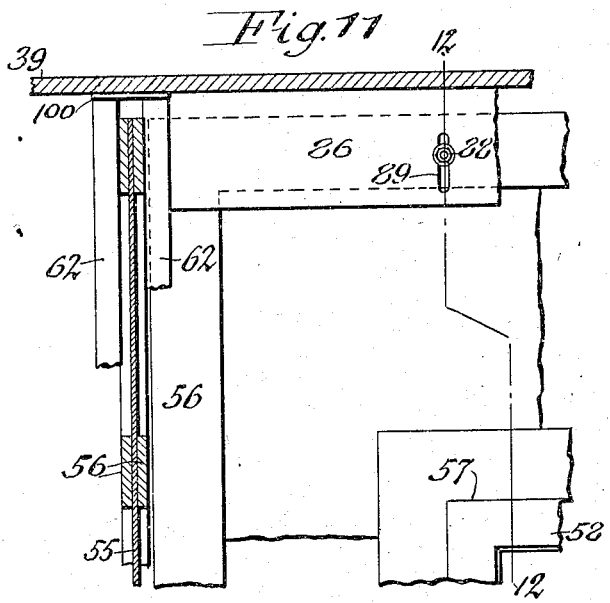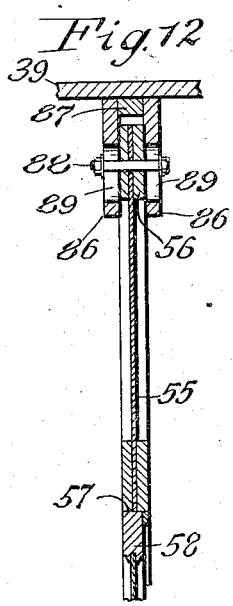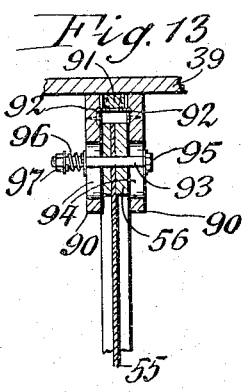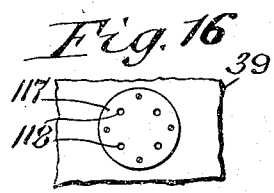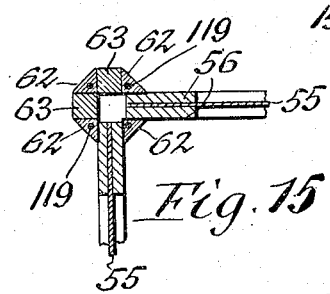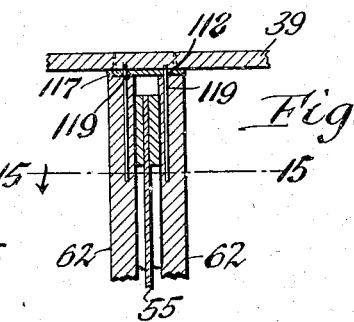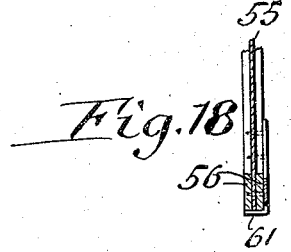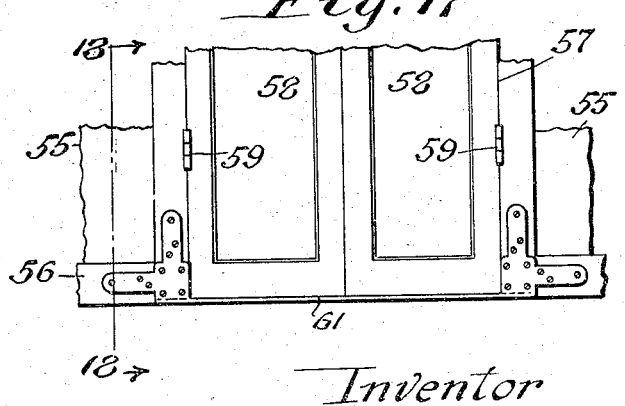

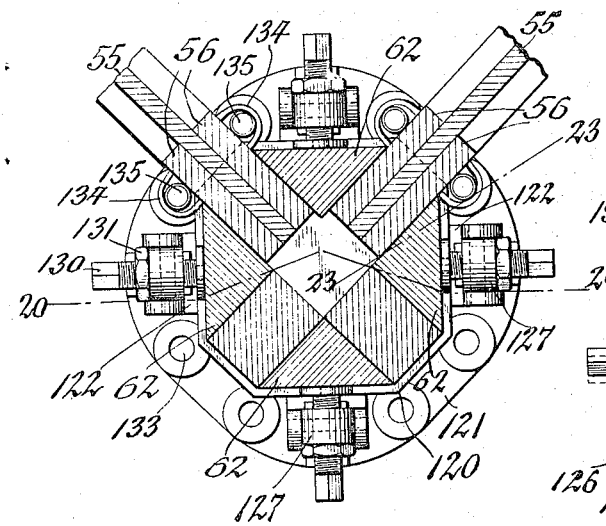
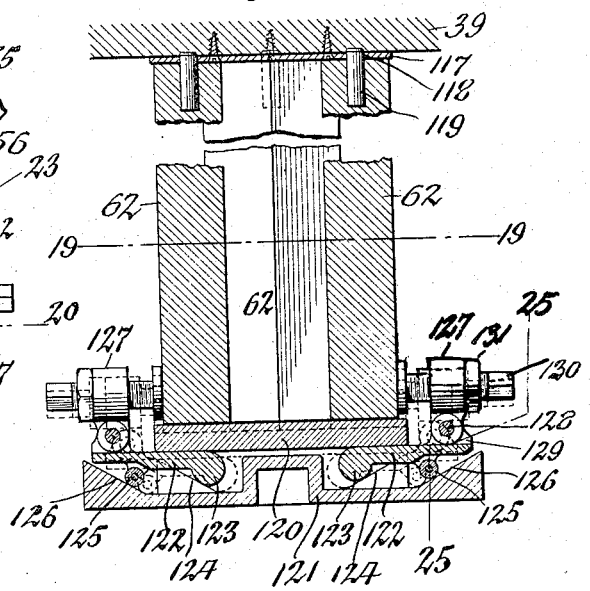
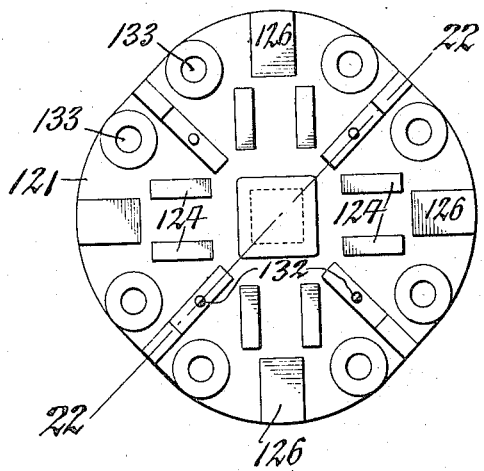
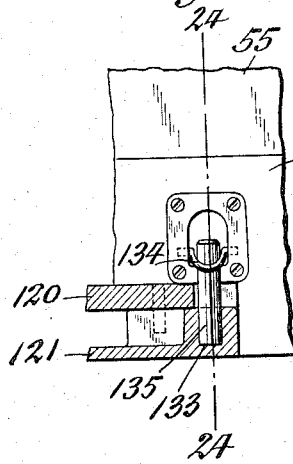
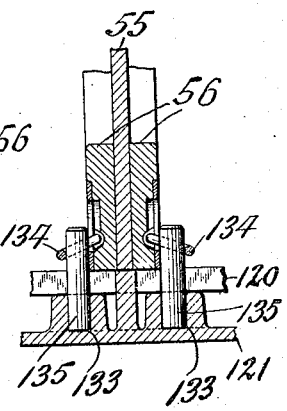
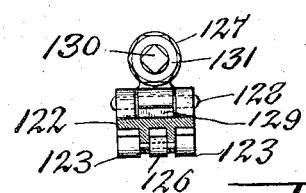
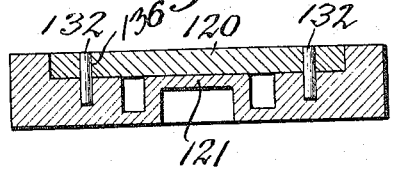

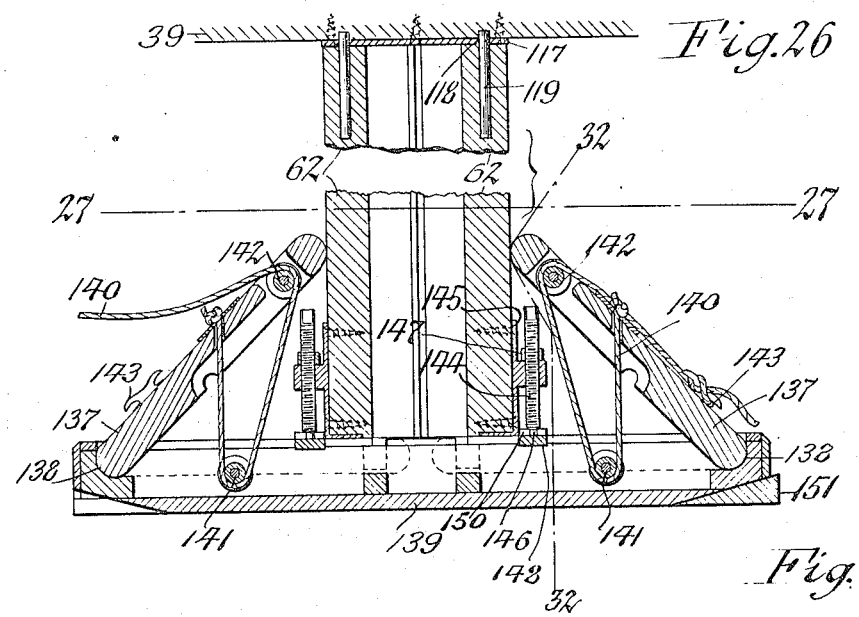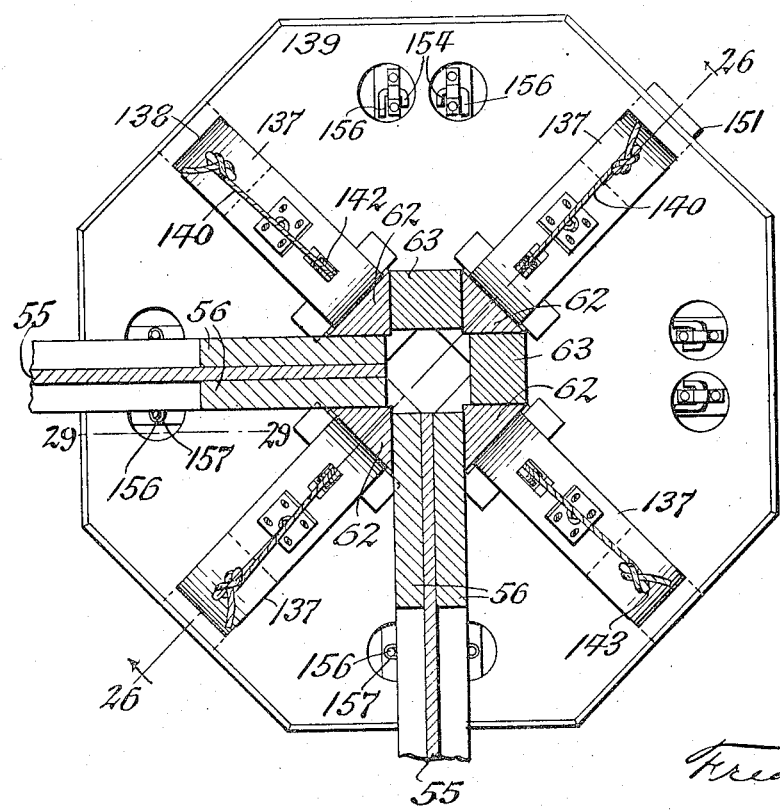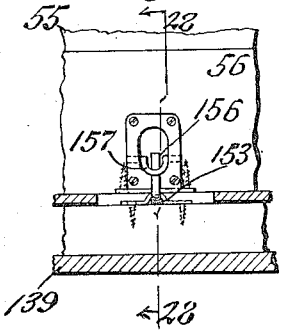

F. J. KEPPLER.
CONVERTIBLE BUILDING.
APPLICATION FILED JUNE 7, 1919.
1,437,148.
Patented Nov. 28, 1922.
8 SHEETS—SHEET 7.
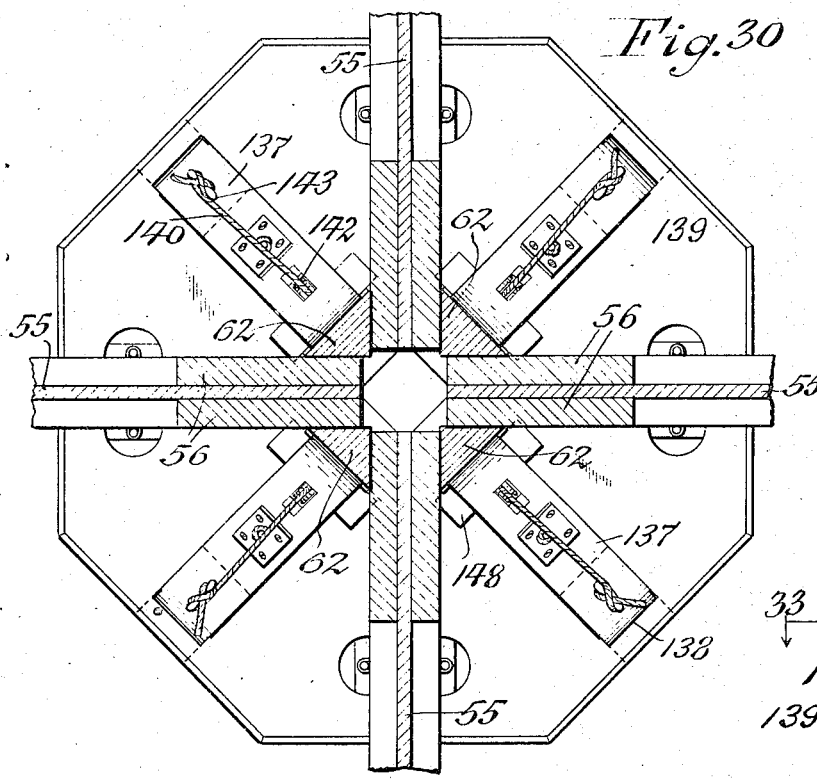
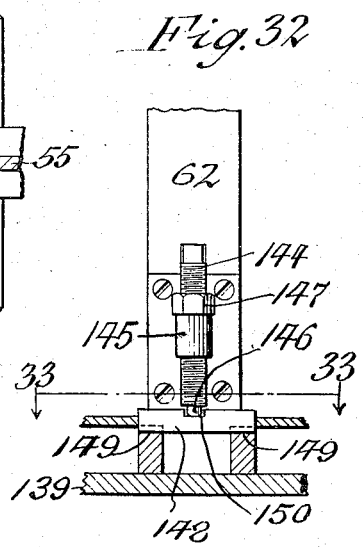
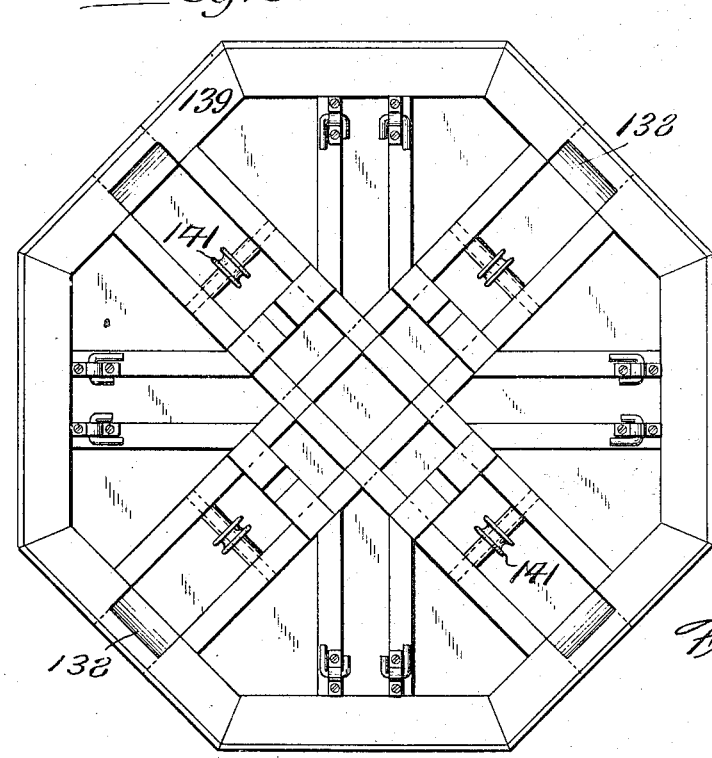
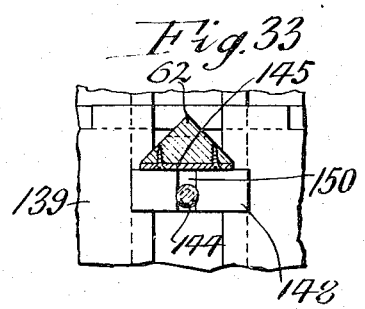
Inventor
Fred J. Keppler
by Dyer & Popp
Attorneys

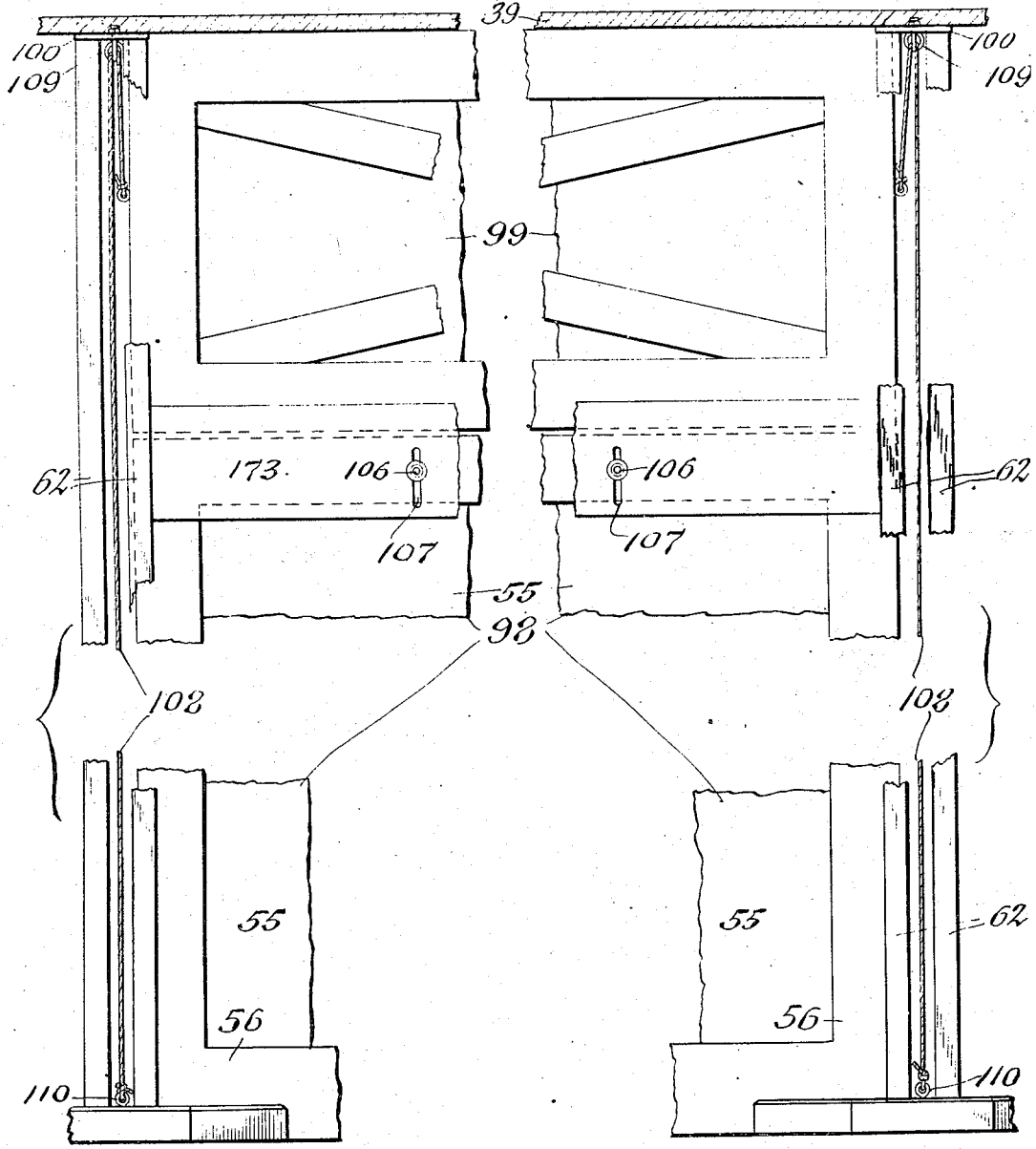

Patented Nov. 28, 1922.

1,437,148

UNITED STATES PATENT OFFICE.

FRED J. KEPPLER, OF BUFFALO, NEW YORK.

CONVERTIBLE BUILDING.

Application filed June 7, 1919. Serial No. 302,569.

*To all whom it may concern:*

Be it known that I, FRED J. KEPPLER, a citizen of the United States, residing at Buffalo, in the county of Erie and State of New York, have invented new and useful Improvements in Convertible Buildings, of which the following is a specification.

This invention relates to a convertible building which can be arranged with little effort to meet the requirements of different conditions and the needs of various tenants, particularly in summer resorts and recreation places, although the same can also be used to advantage generally for summer homes, club houses, hotels, stores, halls, sanitoriums, field hospitals, offices, housing for labor on construction work, army housing, emergency housing, Government construction work in the Reclamation Service, and similar situations.

When used as a summer home, this building can be readily adapted to provide for housing one or more additional guests who may wish to stay over night and thus necessitates increased sleeping capacity. In case a large floor space is required for dancing or similar purposes, this convertible building permits of clearing the entire floor of any panels, partitions, walls, posts or other obstructions within the boundaries thereof. During cool weather the building can be readily enclosed and in warm weather the enclosing walls can be quickly taken down so as to give the occupants the benefits of an open air pavilion. It is also possible to so arrange the rooms that the same will be screened on one side to protect the occupants from insects and also form comfortable and convenient sleeping quarters. When used for store purposes, this building construction permits the space between the floor and ceiling to be divided into sections or spaces of different sizes and dimensions to suit the requirements of the tenant.

It is the object of this invention to provide a convertible building which has this capacity and which can be built at comparatively low cost and is capable of being easily and quickly erected, shifted and dismembered without requiring any special tools for this purpose or any alterations in the units or members which enter into its composition.

In the accompanying drawings: Figure 1 is a perspective view showing a building embodying my invention with one side thereof closed by screens, panels and doors, while another side thereof is exposed to show the internal construction. Figure 2 is a sectional elevation of the building taken on line 2—2, Fig. 3. Figure 3 is a horizontal section taken on line 3—3, Fig. 2. Figure 4 is a horizontal section, on an enlarged scale, showing one form of post and associated parts for removably supporting two walls or partitions between the floor and ceiling of the building. Figures 5 and 6 are fragmentary vertical sections taken on the correspondingly-numbered lines in Fig. 4. Figure 7 is a vertical section taken on line 7—7, Fig. 4. Figure 8 is a fragmentary vertical section taken on line 8—8, Fig. 9, showing the means for detachably securing one of the post sections at its upper end to the underside of the ceiling. Figure 9 is a vertical section taken on line 9—9, Fig. 8. Figure 10 is a fragmentary vertical section showing a modification of the means for adjusting the lower end of a post section relative to the base. Figure 11 is a fragmentary vertical section showing means for closing a gap between the upper edge of a wall or partition and the ceiling. Figure 12 is a vertical section taken on line 12—12, Fig. 11. Figure 13 is a view similar to Fig. 12, showing a modified form of the means for closing a gap between the upper edge of a partition or wall and the ceiling. Figure 14 is a vertical section showing a modification of the means for connecting the upper ends of the post sections with the ceiling. Figure 15 is a horizontal section taken on line 15—15, Fig. 14. Figure 16 is a bottom plan view of the ceiling head or plate with which the upper ends of the post sections are connected with the adjacent part of the ceiling for use in connection with the construction shown in Figs. 14 and 15. Figure 17 is a fragmentary side elevation of the central part of a wall or partition showing the manner of mounting a door in the same. Figure 18 is a fragmentary vertical section taken on line 18—18, Fig. 17. Figure 19 is a horizontal section, taken on line 19—19, Fig. 20, and showing another modification of the means for adjustably supporting the post sections and clamping the same against removable wall sections. Figure 20 is a vertical section taken on line 20—20, Fig. 19. Figure 21 is a top plan view of the base which is used in connection with the construction shown in Figs. 19 and 20. Figure 22 is a vertical cross section taken on line 22—22, Fig. 21, but showing the lifting plate in addition thereto. Figure 23 is a fragmentary vertical section taken approximately on line 23—23, Fig. 19. Figure 24 is a fragmentary vertical section taken on line 24—24, Fig. 23. Figure 25 is a fragmentary vertical section taken on line 25—25, Fig. 20. Figure 26 is a fragmentary vertical section taken on line 26—26, Fig. 27, showing another modification of the means for removably supporting the walls or partitions of a building between the floor and ceiling thereof. Figure 27 is a horizontal section taken on line 27—27, Fig. 26, and showing the manner of utilizing this invention at a corner between two walls arranged at right angles to each other. Figure 28 is a fragmentary vertical section taken on line 28—28, Fig. 29. Figure 29 is a fragmentary vertical section taken on line 29—29, Fig. 27. Figure 30 is a horizontal section similar to Fig. 27, showing this invention utilized for supporting the meeting edges of four removable walls or partitions which are arranged equidistant around a post. Figure 31 is a top plan view of the form of base and associated parts shown in Figs. 26, 27 and 30. Figure 32 is a fragmentary vertical section taken on line 32—32, Fig. 26, showing the means for raising one of the post sections. Figure 33 is a horizontal section taken on line 33—33, Fig. 32. Figure 34 is a fragmentary vertical section showing the manner of mounting a supplemental panel or wall section above a main or lower wall section when the space between the floor and ceiling is of unusual height. Figure 35 is a fragmentary vertical section showing still another modification of the means whereby a post section may be clamped against the removable walls of the building. Figure 36 is a top plan view of one of the clamping members and associated parts shown in Fig. 35. Figure 37 is a horizontal section showing another modification of the means for connecting two adjacent wall sections of a building which are arranged end to end or in the same plane.

Similar characters of reference indicate corresponding parts throughout the several views.

38 represents the floor of the building and 39 the ceiling thereof, both of which may be of any suitable and well known construction. This floor and wall are only permanently connected with each other adjacent to the boundary or circumference thereof, which connection may be effected in any suitable manner but preferably comprises a plurality of permanent outer posts 40 secured at their lower and upper ends to the floor and ceiling adjacent to the marginal portions thereof, an entrance or doorway arranged between an adjacent pair of outer posts which is adapted to be opened and closed by a pair of doors 41, a plurality of lower tight panels 42 which are removably secured between the lower parts of the outer posts and the adjacent parts of the floor, and a plurality of screens 43 which are removably secured between the upper parts of the permanent outer posts and the ceiling of the building. These outer doors, panels and screens may be removed entirely from the building when weather conditions permit and the occupants of the building wish to enjoy outdoor life, but in inclement weather or during the season of the year when insect life is troublesome, these doors, panels and screens may be used for protection against the weather and insects.

The space within the circumference or marginal boundary of the floor and ceiling is adapted to receive the convertible portion of the building which embodies this invention, whereby this space may be left either wholly unobstructed so that the same can be used for dancing or other indoor recreational purposes, or divided into a plurality of separate apartments or rooms of different sizes and shapes to suit the requirements at a particular time. For instance, as shown in Fig. 3, the portable division means of this building which embody my invention are assembled to form a rectangular corridor 45 between the main outer wall of the building and an inner wall which encloses the apartments proper, two large rooms 46 arranged at the left hand end of the building and having their opposing sides connected halfway by a passage 47 while the other half between the same is cut off by a wall or partition 48, a comparatively large apartment 50 arranged at the lower right hand corner which faces on two sides of the building, a small square apartment 51 arranged at the upper right hand corner which faces two sides of the building, an L-shaped apartment 52 arranged adjacent to the corner apartment 51 which faces two sides of the building, and between the L-shaped apartment and the large apartment 50 are arranged a small apartment 53 which faces one side of the building, and also a small apartment 54 which does not face the outer side of the building.

In its general organization the means whereby the space between the floor and ceiling may be thus divided comprise a plurality of posts which are preferably constructed in sections, means for detachably mounting the lower and upper ends of these posts on the floor and ceiling of the building, and a plurality of walls, wall sections or partitions which are mounted on the posts and the floor and ceiling.

Each of these partitions may be constructed in any suitable way, but for the sake of lightness and economy the same preferably comprise a thin body or web 55 of paper board or similar light, durable and inexpensive material, and a marginal frame composed of strips 56 of wood secured to opposite sides of the edge portions of this body or web, as best shown in Figs. 2, 4 and 12. If the wall is to be perfectly tight, the central part of the same may be provided with an ornamental panel 44, as shown in Fig. 2. For the purpose of permitting inter-communication between adjacent rooms which may be separated from each other by a wall of this character, the central part of the latter may be provided with a doorway or opening 57 which is normally closed by a door composed of two horizontally-swinging sections 58 of the type commonly known as "French doors," each of these door sections having a frame which is connected by hinges 59 at its outer edge with the wall, and the inner edges of these door sections being adapted to meet and form a complete separation of one room from another. The meeting edges of these door sections may be connected by a lock 60 of any suitable construction, and the panels of these doors may also be made of glass panes so that when these doors form part of the exterior walls of the room they serve as windows for illuminating the interior of the respective compartment. In order to retain the lower part of the wall on opposite sides of the doorway in their proper position relatively to each other and thereby avoid distortion of the wall, a horizontal sill or threshold 61 is provided which extends across the lower end of the door opening flush with the lower edges of the adjacent parts of the wall and connected with the latter, as shown in Figs. 17 and 18.

At the vertical edges of the removable walls or partitions the same are supported by removable posts which are detachably connected with the floor and ceiling, each of these posts being preferably so constructed that the same is capable of supporting either one wall or a plurality of walls which may meet at this post, this particular construction being however designed more particularly for supporting either four walls which are arranged around the post at angles of 90 degrees relatively to each other, or a lesser number of such walls, depending upon the particular place in the building where this post is to be employed and the character of the space division of the particular part of the building. For this purpose each post comprises four upright sections 62, the body of which is preferably constructed of wood and each section being provided with two inwardly-inclined or converging sides which give the post section a substantially V-shaped or wedge form, so that when the several post sections are assembled an annular series of upright pockets is formed which are arranged radially with reference to the axis of the post and each pocket having its sides arranged parallel with each other and receiving one of the vertical edge portions of one of the walls or partitions. Upon assembling a wall with two post sections of this character and pressing the latter inwardly toward the axis of the post, the wall will be clamped between these wedge-shaped post sections and securely held in place so as to form a very rigid and substantial structure. The operation of thus clamping the sections of a post against a wall, is practically the same regardless of whether the post forms a support for one wall or for a plurality of walls. For instance, as shown in Fig. 4, two walls are supported by a post of which three sections are utilized for clamping and supporting these walls. In such a case, the pockets intended to receive two other walls are occupied by fillers or filling blocks 63, 63, which are of a thickness equal to the vertical edges of the walls and preferably flush with the outer sides of the post sections, so as to produce a finished appearance of the posts when less than the full number of four walls are supported by the same. Various means may be employed for supporting these post sections on the floor and ceiling and clamping the same against opposite sides of the walls therebetween, those shown in Figs. 4–7 being constructed as follows:

64 represents a base which is preferably constructed of cast metal and adapted to rest removably upon the floor underneath the sections of a post and the adjacent parts of the walls supported thereby. A plurality of such bases are employed one for each of the posts, so that it is possible to erect a post between any predetermined part of the floor and ceiling for supporting one or more walls thereon, which base however is not interlocked in any manner on its underside with the floor so that when the base is removed a perfectly smooth, even and unobstructed space is left on the floor enabling the same to be utilized for dancing and other recreation requiring a smooth and finished floor. This base is made hollow for the purpose of receiving the devices whereby the lower ends of the post sections may be pressed inwardly toward the axis of the post for clamping the same against the vertical edges of the respective walls. The clamping device associated with the lower end of each of the post sections comprises a vertically-swinging elbow lever 66—67 which is pivoted at 65 to the base and provided with an inner arm 66 which is adapted to engage with the inner lower corner of the respective post section, and an outer arm 67 which engages with the lower outer corner of the respective post section, these inner and outer corners being preferably formed by means of antifriction rollers 170, 171, each of which is mounted on a socket 68 carried by the lower wooden portion of the respective post section, as best shown in Fig. 5. When assembling the post section with the base, the clamping lever is turned so that its outer arm is arranged below the upper surface of the base and its inner arm is arranged in a substantially vertical position, so as to permit the lower end of the post section to be pushed inwardly over the outer arm of the clamping lever and engage its lower inner roller with the inner arm of the clamping lever. Upon continuing the inward motion of the post section after its inner roller has thus engaged the inner arm of the clamping lever, the latter will be pushed downwardly and its companion outer arm will be raised, as shown in Fig. 5, which movement continues until the post section is stopped, this being determined by engagement of the same either with two adjacent walls, or two adjacent fillers, or an adjacent wall and filler, as shown in Fig. 4. The surfaces of the inner and outer arms of the clamping lever are preferably inclined at such an angle relatively to each other that when this lever is turned inwardly these inclined surfaces operate as cams to elevate the respective post section and cause its upper end to bear firmly against the underside of the ceiling, and thus avoid any looseness between the several parts as well as supporting the wall firmly. In order to hold the clamping lever in its innermost position, the outer arm thereof is provided with a depending link 69 which is pivoted thereto at its upper end while its lower end has pivotally connected therewith a dog or pawl 70 which engages with one or another of a radial row of ratchet teeth 71 arranged on the adjacent outer part of the base. By this means it is only necessary to push the clamping lever inwardly to its fullest extent during which movement the locking dog or pawl will trip over the row of ratchet teeth and then automatically hold the clamping lever in its innermost position. Whenever it is desired subsequently to dismantle the post, it is only necessary to lift the pawl out of engagement from the ratchet teeth and then turn the clamping lever outwardly which will operate to release the post section from the adjacent wall, the disengagement of the dog from the ratchet teeth and the outer motion of the same, together with the clamping lever, being preferably effected by providing the dog on its upper side with an eye 172 which may be engaged by a retracting tool.

In order to produce a finished appearance on the upper side of the base, the latter is covered by a plate 72 which covers the mechanism within the base but is provided with a plurality of slots 73 through which the outer and inner arms of the clamping levers are free to move for co-operation with the lower ends of the post sections. The upper ends of the post sections may be secured to the ceiling in a variety of ways the means for this purpose shown in Figs. 8 and 9, being constructed as follows:

100 represents a ceiling plate or head, preferably of metal secured to the ceiling above the post sections and adapted to be engaged by the upper ends of the latter. Adjacent to the upper end of each post section is arranged a radial row of ratchet teeth 101 which project downwardly into a radial groove 102 in the upper end of the adjacent post section and thus serve as a guide for the latter which permits radial movement thereof but prevents lateral movement of the same. On the outer side of the upper part of each post section is arranged a vertically movable spring catch 103 which is guided in a casing 104 secured to the post section and yieldingly held in its elevated position by a spring 105 arranged between the casing and said catch. Upon pushing the upper end of each post section inwardly in engagement with walls or filling pieces, the catch 103 trips along the ratchet teeth 101 until the post section is tight against the walls or fillings and is then automatically locked in this position until manually released.

If desired, the filling pieces or blocks which are substituted for the walls or partitions to fill out the spaces between adjacent sections of the posts may be held solely by friction but as a further safeguard to prevent accidental removal of the same from between a pair of adjacent post sections, means are preferably provided for locking the lower ends of the several fillings in their innermost position. Any suitable means may be employed for this purpose but for the sake of uniformity of manufacture and to facilitate the assemblage as well as dismembering of the parts, these means are preferably constructed identical with the means whereby the lower ends of the post sections are pressed inwardly and locked automatically in their operative position. For this purpose the inner and outer corners of each filling are provided at the lower end of the same with inner and outer anti-friction rollers 74, 75 which are engaged by the inner and outer arms 76, 77, of a clamping elbow lever which is pivoted by a horizontal pin 78 on the adjacent part of the base, and a locking pawl or dog 79 is provided which is connected by means of a link 80 with the outer arm of the lever and engages its outwardly projecting end with one or another of a row of ratchet teeth 81 arranged in a radial line on the adjacent lower part of the base. By means of this construction, the lower end of the filling may be slid over the upper side of the base while the outer arm of the respective clamping lever is depressed and the inner arm thereof is elevated, so that by the continued inward movement of this filling the inner roller 74 thereof engages with the inner arm 76 of the elbow lever and turns the same downwardly while the outer arm 77 thereof is elevated into engagement with the outer roller 75, and when this filling has reached the desired position the same is automatically locked in position by engagement of the locking dog 79 with one or another of the ratchet teeth 81. The engagement of this dog with the ratchet teeth is effected by means of an eye 82 arranged on the top of this dog and adapted to receive a tool for disengaging this pawl and withdrawing the clamping lever into a position which will permit removal of the filling. When no filling is employed between two adjacent post sections, but instead a wall section is clamped between the same, then the respective filling clamping device is idle but the same does not interfere with the proper insertion of a wall section into its proper place between two adjacent post sections. In Fig. 6 a filling clamping device is shown at the left in co-operation with a filling while at the right hand side of this figure a filling clamping device is represented in an inactive position in which it does not interfere with the placing of a wall section upon a base and between adjacent post sections.

It is desirable to provide means under the control of the occupant in each room or apartment which will prevent lateral disturbance of the wall between adjacent rooms and avoid possible intrusion into a room by a person in the room on the opposite side of this wall for protection against theft or other unlawful purpose. In order to accomplish this purpose in a simple and efficient manner, the base is provided on opposite sides adjacent to the inner lower portion of each wall with upwardly-opening sockets 83 which receive removable locking or retaining pins 84 and the adjacent part of the wall is provided on its opposite sides with vertically-swinging catch or locking loops 85 each of which is adapted to embrace the upper end of one of these locking pins and thereby hold the wall positively against lateral motion in both directions. It is therefore impossible by reason of this mechanism for any one on one side of the wall to shift the latter with a view of gaining access to the room on the opposite side of the same even though the party attempting such removal should manipulate those parts of the posts and the mechanism associated therewith which are accessible in that particular room.

In order to permit of closing any gap between the upper edge of the wall or partition and the underside of the ceiling in the event that the floor sags or other defects develop, means are provided for filling this space. These means, as shown in Figs. 11 and 12, may comprise a filling member composed of two upright side plates 86 arranged lengthwise on opposite sides of the upper edge of the wall and a cross piece or plate 87 connected with the upper portions of these side plates, and one or more clamping bolts 88 each of which passes through an opening in the upper part of the wall and a pair of corresponding vertical slots 89 in the side plates. For the purpose of closing any gap between the upper edge of the wall and the ceiling, this filling or closure member is raised relatively to the wall until its upper edge engages with the underside of the ceiling after which the same is retained in this position by tightening each of the clamping bolts 88. By this means absolute privacy may be obtained as between rooms on opposite sides of the wall, even though there may be warping or inaccuracy in the manufacture or shrinking of these parts which otherwise would interfere with the proper fit between the same.

If desired, the space between the upper edge of the wall and the underside of the ceiling may be closed by the means which are shown in Fig. 13, and which comprise two upright side plates 90 arranged on opposite sides of the wall, a horizontal cross piece 91 pivotally connected to the upper parts of the side plates by means of hinges 92, one or more horizontal tie or clamping bolts 93 passing transversely through an opening in the wall and through vertical slots 94 in the side plates and bearing with its head 95 against the outer side of one of the side plates, and a spring 96 surrounding this bolt and bearing at one end against the nut 97 of this bolt while its other end bears against the outer side of the other side plate. By this means a frictional connection is produced between this filling member and the wall which permits of simply pushing this member upwardly on the wall until it engages with the ceiling, after which the same is held in place automatically without requiring any further attention.

In case the ceiling is at such a distance above the floor as would make it unwieldy to construct the walls or partitions in single sections, such walls for convenience in handling the same will be constructed of a main lower section 98 which rests with its lower edge on the floor and an upper supplemental section 99 which is arranged between the upper edge of the main section and the underside of the ceiling, as shown in Fig. 34. In this case both the upper and lower sections of the wall are connected at their opposite vertical edges with the supporting posts which may be constructed and removably mounted on the floor and ceiling in substantially the same manner in which this is accomplished by the means shown in Figs. 4–9. The joint between the lower edge of the upper wall section and the upper edge of the lower wall section in this case may be closed by means of a cover plate or board 173 which is arranged lengthwise across the joint between these wall sections and adjustably connected with one of them, for instance, the lower section, by means of one or more clamping bolts 106 each of which is secured to the lower wall section and passes through a vertical slot 107 in the cover plate. For convenience in raising and lowering the upper wall section, means are provided which preferably comprise two hoisting lines 108 each of which passes with its upper turn around a pulley 109 mounted on the underside of the central part of the head or ceiling plate of the respective post and one end of each hoisting line being secured to the adjacent vertical edge of the upper wall section while the other end of this line is detachably secured within the hollow post, preferably by tying the same to an eye 110 projecting upwardly from the central part of the base which supports this particular post.

Instead of employing a dog and ratchet teeth for holding the elbow-shaped clamping levers in their operative position, this may be accomplished by the means which are shown in Fig. 10 and which comprise a link 111 pivoted at its upper end to the outer arm of the clamping lever 113, while its lower end rests on the bottom of the base 64, a shifting bar 112 pivotally connected at its inner end with the lower end of the link 111, and a clamping bolt 115 passing through the front end of the shifting bar and through an inclined or cam-shaped slot 116 formed in the adjacent part of the base. Upon pressing the shifting bar downwardly the bolt 115 by engaging with the inclined slot 116 will cause the clamping lever to be turned inwardly and the respective post section or filling piece may be locked in its innermost position upon tightening this bolt.

Instead of employing the ratchet locking mechanism which is shown in Figs. 8 and 9 for holding the upper end of each post section in its innermost position, the means shown in Figs. 14, 15 and 16 may be substituted therefor. These last mentioned means comprise a ceiling plate or head 117 preferably constructed of a plate of sheet metal of circular form which is secured to the underside of the ceiling and provided with a plurality of dowel openings or sockets 118, and a dowel pin 119 arranged at the upper end of each post section and engaging with one of the dowel openings in the ceiling plate.

In the modified construction of the means for holding the post sections in place shown in Figs. 19–25, a lifting plate 120 is interposed between the lower ends of the post sections and a base 121 which rests upon the floor, and means are provided for simultaneously raising the lifting plate and pushing the lower part of each post section inwardly into its operative position. Each of these plate lifting and post pressing devices comprises a shifting carriage 122 arranged between corresponding marginal parts of the lifting plate and base and provided at its inner part with a pair of runners 123 which engage with a pair of inclines 124 on the inner part of the base and on its outer part with a single runner 125 which engages with a similar incline 126 on the outer part of the base, a shifting arm 127 pivotally connected by means of a pin 128 at its lower end to the outer end of the shifting carriage and provided in front of said pivot with a heel 129 which engages with the upper side of this carriage and above said pivot with a horizontal screw threaded opening, a clamping screw 130 engaging with the threaded opening in the shifting arm and bearing at its inner end against the outer side of the lower part of one of the post sections, and a jam nut 131 applied to the clamping screw 130 and bearing against the outer side of the shifting arm. Upon tightening the clamping screw 130, so that its inner end bears against the post section, the latter is pushed inwardly so as to firmly hold the wall sections on opposite sides thereof and at the same time the pressure of this screw causes the shifting carriage to rise on the inner and outer inclines so that the shifting carriage is raised against the lower ends of the post sections and causes the latter to firmly engage the ceiling plate. For the purpose of dismembering the parts, the screw 130 is withdrawn outwardly sufficiently to permit the shifting arm 127 to be tilted into a position in which the lifting carriage may be released from the lifting plate and the base, thereby furnishing the necessary clearance to permit the post sections to be lowered out of engagement from the ceiling plate or head and removed laterally from the wall. In this construction the walls may also be held against lateral displacement relative to each post by employing upright locking or retaining pins 135 on opposite sides of each wall and removably seating the lower ends of these pins in sockets 133 formed in the adjacent part of the base, while the upper ends of these pins are engaged by vertically swinging retaining loops or catches 134 mounted on the adjacent parts of the wall, as shown in Figs. 19, 23 and 24. The lifting plate 120 in this construction is permitted to move vertically with reference to the base but held against lateral displacement thereon by providing the base with a plurality of upright dowels or guide pins 132 which engage their upper ends with guide openings 136 in the lifting plate, as shown in Fig. 22.

The modification of my invention shown in Figs. 26–33 for holding the lower ends of the post sections in place relatively to the walls is constructed as follows:

137 represents a plurality of clamping levers each of which is pivoted at its outer end on a bearing 138 formed on the marginal part of the base 139, while its upper end bears against the outer side of the adjacent post section. This engagement of the parts is taking place while the clamping lever is in an inclined position. Each of these clamping levers is pressed downwardly and held in its operative position by means of tightening line 140 secured at its opposite ends to the lever and having a lower turn which passes around a guide roller 141 on the base and an upper turn which passes around a guide roller 142 on the inner, upper part of the clamping lever. Upon drawing on either end of this tightening line, the clamping lever will be forced downwardly and the respective post section will be pressed inwardly, and after these parts have been tightened the requisite extent, then the free end of the line is secured to a cleat 143 on the outer side of the clamping lever, as best shown in Figs. 26, 27 and 30. When the base and clamping levers mounted thereon are not in use, the latter may be lowered into the hollow space within the base, as shown by dotted lines in Fig. 26, thereby rendering the same more compact and permitting the same to be stowed away in a comparatively small amount of space. In addition to the means for pressing the lower ends of the post sections inwardly into their operative position, each of these posts is provided at its lower end with lifting means so as to cause its upper end to bear properly against the ceiling plate and take up any slack in the post between the floor and ceiling. The preferred means for this purpose which are shown in Figs. 26, 32 and 33 comprise an upright lifting screw 144 which engages with an internally screw threaded opening formed in a bracket 145 arranged on the outer side of the lower part of one of the post sections and provided with a lower reduced end 146, a clamping nut 147 arranged on this screw and engaging with the upper side of this bracket, and a thrust bar 148 removably mounted at its opposite ends in notches 149 formed in the upper side of the base and provided on its upper side with a groove 150 which is arranged radially with reference to the axis of the post and which receives the lower reduced end of an adjacent clamping screw. By this means each post section may be raised the requisite extent and also moved inwardly by means of the clamping lever to produce a tight fit between the several parts which co-operate and still permit of dismembering these parts when required.

For the purpose of tilting the base and producing a tight fit between the post sections and the base and ceiling, a wedge 151 may be driven between the floor and the base, as shown in Figs. 26 and 27.

In Figs. 27–31 is shown a modification of the means for preventing the wall between two adjacent rooms from being shifted laterally from either side of this wall. This modified construction comprises two locking levers arranged on opposite sides of the wall and each having a horizontal wrist 152 which is journaled transversely in a bearing 153 on the adjacent part of the base, an inner arm 154 arranged on the inner end of this wrist and adapted to engage with a recess or notch 155 on the underside of the adjacent part of the respective wall, and an outer arm 156 arranged at the outer end of the wrist and adapted to be engaged by a vertically-swinging retaining or locking loop 157 on the adjacent part of the wall when the inner arm is engaging with the notch 155. When the parts are in this position, as indicated in Figs. 28 and 29, the wall held thereby cannot be moved laterally in either direction, thereby securing the occupants in the room on one side of this wall against intrusion from the occupants in the room on the opposite side of this wall. When, however, it is desired to remove this wall from the base, the retaining loops 157 on its opposite sides of the wall are lifted out of engagement from the outer arms of the locking lever after which the latter may be swung downwardly into the position indicated in Fig. 27, which permits the wall between the same to be moved laterally in either direction for assembling or dismembering the parts.

As a further modification of the means for pressing the lower end of the post sections inwardly, the same may be constructed as shown in Figs. 35 and 36, in which case an inclined pressing lever 158 bears at its inner end against the outer side of the post section while its outer end is pivoted on a bearing 159 on the marginal part of the base 160, the downward movement of this lever for tightening the same being effected by means of a tightening lever 161 pivoted at its lower end to this base and provided at its upper end with a pair of rollers 162 which bear against the upper side of the clamping lever. Backward motion of the tightening lever in this case is prevented by means of a wedge 163 inserted between the outer side of the tightening lever and the outer end of a slot 164 in the clamping lever through which the upper part of the tightening lever projects.

Instead of constructing the post sections in the form shown in Figs. 4, 19, 27 and 30, which is designed more particularly for supporting the adjacent ends of four walls, a modification of the post may be made so as to adapt the same more particularly for supporting the adjacent edges of two walls which are arranged in the same plane and have two of their vertical edges arranged edge to edge, as shown in Fig. 37. In this construction, two post sections 165, 165 are employed each of which is of sufficient width to overlap the end portions of two adjacent walls 166 and the central part of each of these post sections is provided with a rib 167 which extends between the adjacent vertical edges of these walls so as to maintain the same in the proper position relative to each other. These two post sections may be detachably connected with each other by any suitable means, for instance, by means of one or more tie bolts 168 each of which passes through both of these post sections and permits of readily assembling or dismembering the post and the parts associated therewith.

For convenience in storing those parts of the means whereby the space between the floor and ceiling is divided when these parts are not required for use, an extension or storage compartment 169 is provided on one side of the building which is of sufficient capacity to store either all or a portion of these divisional means.

It will now be understood that by the use of my invention in one or the other of the various forms which have been set forth, it is possible to very easily, quickly and conveniently divide the space between the floor and ceiling of a building into rooms or compartments which vary in size and shape to suit the particular purpose for which the same are intended and that this is accomplished by means which are comparatively inexpensive in construction, not liable to get out of order and which will not mar any part of the floor which may at one time or another be divided off into a room for a particular purpose.

I claim as my invention:

1. A convertible building comprising a floor, a ceiling, and means for dividing the space between the floor and ceiling including a plurality of posts, means for supporting said posts on said floor and in engagement with said ceiling, comprising means for moving said posts vertically, and walls removably mounted on said posts.

2. A convertible building comprising a floor, a ceiling, and means for dividing the space between said floor and ceiling including a plurality of removable walls, a plurality of removable posts each of which has a plurality of upright sections provided with V-shaped inner parts which receive between them the edges of said walls, bases removably arranged on said floor below each post, and means arranged between each post and base for pressing the post sections against said walls comprising an elbow lever pivoted on said base and having inner and outer arms equipped with the inner and outer lower corners of one of said post sections.

3. A convertible building comprising a floor, a ceiling, and means for dividing the space between the floor and ceiling including a plurality of removable walls, a plurality of removable posts each of which has a plurality of upright sections provided with V-shaped inner parts which receive between them the edges of said walls, bases removably arranged on said floor below each post, and means arranged between each post and base, for pressing the post sections against said walls comprising an elbow lever pivoted on said base and having inner and outer arms engaging with the inner and outer lower corners of one of said post sections, and means for holding said lever in its tightened position on said base.

4. A convertible building comprising a floor, a ceiling, and means for dividing the space between the floor and ceiling including a plurality of removable walls, a plurality of removable posts each of which has a plurality of upright sections provided with V-shaped inner parts which receive between them the edges of said walls, bases removably arranged on said floor below each post, and means arranged between each post and base for pressing the post sections against said walls comprising an elbow lever pivoted on said base and having inner and outer arms engaging with the inner and outer lower corners of one of said post sections, and means for holding said lever in its tightened position on said base comprising a row of ratchet teeth arranged on said base, and a pawl operatively connected with said lever and engaging with said teeth.

5. A convertible building comprising a floor, a ceiling, and means for dividing the space between the floor and ceiling including a plurality of removable walls, a plurality of removable posts each of which has a plurality of upright sections provided with V-shaped inner parts which receive between them the edges of said walls, bases removably arranged on said floor below each post, and means arranged between each post and base for pressing the post sections against said walls comprising an elbow lever pivoted on said base and having inner and outer arms engaging with the inner and outer lower corners of one of said post sections, and means for holding said lever in its tightened position on said base comprising a row of ratchet teeth arranged on said base, a link connected at its upper end with the outer arm of said lever, and a pawl connected with the lower end of said link and engaging with said teeth.

6. A convertible building comprising a floor, a ceiling, and means for dividing the space between said floor and ceiling including a plurality of removable walls, a plurality of removable posts each of which has a plurality of upright sections provided with V-shaped inner parts which receive between them the edges of said walls, bases removably arranged on said floor below each post, and means arranged between each post and base for pressing the post sections against said walls comprising an elbow lever pivoted on said base and having inner and outer arms, and rollers arranged at the lower inner and outer corners of each of said post sections and engaged by said arms.

7. A convertible building comprising a floor, a ceiling, and means for dividing the space between said floor and ceiling including a plurality of removable walls, a plurality of removable posts each of which has a plurality of upright sections, some of which receive the edge of a wall between them, fillings arranged between other sections of said post, and means for pressing said fillings inwardly comprising a plurality of elbow levers pivoted to swing in a vertical plane on said base and each having inner and outer arms engaging with the lower end of a filling, and means for holding said lever in position.

8. A convertible building comprising a floor, a ceiling, and means for dividing the space between said floor and ceiling including a plurality of removable walls, a plurality of removable posts each of which has a plurality of upright sections which receive between them the edges of said walls, and means for connecting the upper ends of said post sections with said ceiling comprising a head plate secured to the ceiling above each post and provided with a plurality of rows of ratchet teeth, and a spring pawl mounted on each of said post sections and engaging with the ratchet teeth of one of said rows.

9. A convertible building comprising a floor, a ceiling, and means for dividing the space between said floor and ceiling including a plurality of removable walls, a plurality of removable posts each of which has a plurality of upright sections which receive between them the edges of said walls, and means for connecting the upper ends of said post sections with said ceiling comprising a head plate secured to the ceiling above each post and provided with a plurality of rows of ratchet teeth, and a spring pawl mounted on each of said post sections and engaging with the ratchet teeth of one of said rows, the upper end of each post section being provided with a groove which receives the adjacent row of ratchet teeth.

10. A convertible building comprising a floor, a ceiling, and means for dividing the space between said floor and ceiling including a plurality of removable walls, a plurality of removable posts each of which has a plurality of upright sections, and means for automatically moving each of said post sections vertically upon moving the same horizontally manually.

11. A convertible building comprising a floor, a ceiling, and means for dividing the space between said floor and ceiling including a lower wall section adapted to rest at its lower edge on said floor, an upper wall section adapted to rest at its lower edge on the upper edge of said lower wall section while its upper edge engages the ceiling, posts removably arranged between said floor and ceiling and supporting said wall sections, and means for raising and lowering said upper wall section comprising hoisting lines guided on the ceiling and each connected at one end with said upper wall section while its other end is fastened within one of said posts.

FRED J. KEPPLER.